(12) United States Patent
Tsai

(10) Patent No.: US 10,622,814 B2
(45) Date of Patent: Apr. 14, 2020

(54) POWER CONVERSION APPARATUS

(71) Applicant: FSP TECHNOLOGY INC., Taoyuan (TW)

(72) Inventor: Chien-Li Tsai, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 875 days.

(21) Appl. No.: 15/145,817

(22) Filed: May 4, 2016

(65) Prior Publication Data

US 2017/0018934 A1 Jan. 19, 2017

(30) Foreign Application Priority Data

Jul. 13, 2015 (TW) .............................. 104122513 A

(51) Int. Cl.
| | |
|---|---|
| *H02J 5/00* | (2016.01) |
| *H02M 3/156* | (2006.01) |
| *H02M 1/10* | (2006.01) |
| *H02M 1/00* | (2006.01) |

(52) U.S. Cl.
CPC ................. *H02J 5/00* (2013.01); *H02M 1/10* (2013.01); *H02M 3/156* (2013.01); *H02M 2001/007* (2013.01)

(58) Field of Classification Search
CPC ............ H02J 5/00; H02M 1/10; H02M 3/156; H02M 2001/007
USPC ...................................................... 307/43–87
See application file for complete search history.

(56) References Cited

U.S. PATENT DOCUMENTS

| | | | | |
|---|---|---|---|---|
| 5,247,205 | A * | 9/1993 | Mototani | G06F 1/263 307/23 |
| 6,630,753 | B2 * | 10/2003 | Malik | H02J 9/061 307/64 |
| 2006/0028186 | A1 * | 2/2006 | Yan | H02M 3/155 323/225 |
| 2012/0169124 | A1 * | 7/2012 | Nakashima | H02J 3/32 307/64 |
| 2013/0020872 | A1 * | 1/2013 | Kinnard | H02J 9/061 307/64 |
| 2013/0093381 | A1 * | 4/2013 | McGinley | H02J 7/0068 320/107 |
| 2013/0162023 | A1 * | 6/2013 | Watanabe | H03K 17/687 307/9.1 |
| 2013/0188401 | A1 * | 7/2013 | Jin | H02H 3/14 363/21.17 |

(Continued)

Primary Examiner — Brandon S Cole
(74) Attorney, Agent, or Firm — JCIPRNET

(57) ABSTRACT

A power conversion apparatus including a main power converter and an auxiliary power converter is provided. The main power converter converts an AC power to a first DC power, and then converts the first DC power to a DC output power. The main power converter has a first power conversion terminal for outputting the first DC power. The auxiliary power converter converts an auxiliary power to a second DC power, and then converts the second DC power to the DC output power. The auxiliary power converter has a second power conversion terminal for outputting the second DC power. The first power conversion terminal and the second power conversion terminal are commonly coupled to a DC power conversion circuit, such that the main power converter and the auxiliary power converter share the DC power conversion circuit and generate a DC output power.

14 Claims, 4 Drawing Sheets

(56) References Cited

U.S. PATENT DOCUMENTS

| | | | |
|---|---|---|---|
| 2014/0077602 A1* | 3/2014 | Liu .................. | H02J 1/102 |
| | | | 307/64 |
| 2015/0214742 A1* | 7/2015 | Yu ................... | H02J 1/102 |
| | | | 307/86 |
| 2017/0063150 A1* | 3/2017 | Sakamoto ......... | H01M 10/44 |
| 2019/0058409 A1* | 2/2019 | Ishibashi ........... | H02M 1/14 |

* cited by examiner

POWER CONVERSION APPARATUS

CROSS-REFERENCE TO RELATED APPLICATION

This application claims the priority benefit of Taiwan application serial no. 104122513, filed on Jul. 13, 2015. The entirety of the above-mentioned patent application is hereby incorporated by reference herein and made a part of this specification.

BACKGROUND OF THE INVENTION

Field of the Invention

The invention relates to a power conversion apparatus, and more particularly, to a power conversion apparatus having a power supply structure with a main power converter and an auxiliary power converter.

Description of Related Art

As internet and technology rapidly develop, the demands of enterprises for information technology (IT) are also increasing. As a result, integrated computers having high speed computing and large storage capabilities are formed by integrating a large number of servers through the internet, and are widely adopted by enterprises. In addition, many electronic devices are dedicated to processing and computing important data, and the operation stability of such types of electronic devices is a top priority for users.

More specifically, these types of servers or electronic devices with more important purposes require stable power to maintain normal operation thereof under any condition to avoid data loss. In the conventional, a main-backup power conversion structure having a main power converter and an auxiliary power converter is usually adopted as the power supply for these types of servers or electronic devices.

Generally, in the main-backup power conversion apparatus design, the main power converter usually utilizes a front level conversion circuit to perform AC-DC conversion power factor correction on the AC power, then utilizes a back level conversion circuit to perform DC-DC conversion on the output power generated by the front level conversion circuit, so as to generate an output power matching a nominal specification. Here, the voltage value of the DC power generated by the front level conversion circuit of the main power converter is between 370V-400V.

On the other hand, since the auxiliary power converter usually uses battery as power supply for power conversion, the voltage value of the output of the auxiliary power converter is around 48V. As a result, in the current applications, the auxiliary power converter is usually designed as two-level (front level and back level) conversion circuits, so as to boost the battery power via the front level conversion circuit, and then buck the output power outputted by the front level conversion circuit via the back level conversion circuit, such that a nominal voltage matching specifications is outputted accordingly.

It is known that the current main-backup power conversion apparatus must require disposition of conversion circuits in the respective back level conversion circuits of the main power converter and the auxiliary power converter in order to perform power conversion, so both the main power converter and the auxiliary power converter cannot share one same DC power conversion circuit, and therefore, the overall design of the power conversion apparatus is more complicated. Moreover, in the current main-backup power conversion apparatus design today, at least 4 levels of conversion circuits are required to realize the main-backup power supply function.

SUMMARY OF THE INVENTION

The invention provides a power supply apparatus to solve the aforementioned technical issues.

The provided power conversion apparatus includes a main power converter and an auxiliary power converter. The main power converter converts an AC power to a first DC power, and then converts the first DC power to a DC output power. The main power converter has a first power conversion terminal for outputting the first DC power. The auxiliary power converter converts an auxiliary power to a second DC power, and then converts the second DC power to the DC output power. The auxiliary power converter has a second power conversion terminal for outputting the second DC power. The first power conversion terminal and the second power conversion terminal are commonly coupled to a DC power conversion circuit, such that the main power converter and the auxiliary power converter share the DC power conversion circuit and generate the DC output power.

In an exemplary embodiment, the power conversion apparatus further includes a power switch controller. The power switch controller is coupled to the first power conversion terminal, the second power conversion terminal, and the DC power conversion circuit. The power switch controller detects whether the main power converter satisfies a normal power-supplying condition, and generates the DC output power with one of the main power converter and the auxiliary power converter based on the result of the determination.

In an exemplary embodiment, when the power switch controller determines that the main power converter satisfies the normal power-supplying condition, the main power converter is controlled by the power switch controller to perform a power conversion action and generate the DC output power accordingly, and thus the auxiliary power converter is controlled by the power switch controller to stop in operation. Moreover, when the power switch controller determines that the main power converter does not satisfy the normal power-supplying condition, the auxiliary power converter is controlled by the power switch controller to perform the power conversion action and generate the DC output power accordingly, and thus the main power converter is controlled by the power switch controller to stop in operation.

In an exemplary embodiment, the main power converter includes a power factor correction circuit. The power factor correction circuit is configured to perform a power factor correction on the AC power, and accordingly generate the first DC power.

In an exemplary embodiment, an auxiliary power converter includes a high conversion ratio power conversion circuit. The high conversion ratio power conversion circuit is configured to boost or buck the auxiliary power, and accordingly generate the second DC power with a voltage matching the first DC power.

In an exemplary embodiment, the main power converter and the auxiliary power converter commonly include the DC power conversion circuit. The DC power conversion circuit is coupled to the power factor correction circuit and the high conversion ratio power conversion circuit, and is configured to convert one of the first DC power and the second DC power to the DC output power.

In an exemplary embodiment, the high conversion ratio power conversion circuit includes at least one of a plurality of high boost ratio power conversion circuits for boosting the auxiliary power. The high boost ratio power conversion circuits are serially connected, an input terminal of a first one of the high boost ratio power conversion circuits receives the auxiliary power, and an output terminal of a last one of the high boost ratio power conversion circuits outputs the DC output power.

In an exemplary embodiment, except the last one of the high boost ratio power conversion circuits, each high boost ratio power conversion circuit includes a first inductor, a first diode, a second diode, and a first capacitor. A first terminal of the first inductor serves as an input terminal of the each high boost ratio power conversion circuit. An anode terminal of the first diode is coupled to a second terminal of the first inductor. An anode terminal of the second diode is coupled to the second terminal of the first inductor, and a cathode terminal of the second diode is coupled to the last one of the high boost ratio power conversion circuits. A first terminal of the first capacitor is coupled to a cathode terminal of the first diode, and a second terminal of the first capacitor is coupled to a ground terminal, wherein the first terminal of the first capacitor serves as an output terminal of the each high boost ratio power conversion circuit.

In an exemplary embodiment, the last one of the high boost ratio power conversion circuits includes a second inductor, a third diode, a second capacitor, and a switch. A first terminal of the second inductor is coupled to the cathode terminal of the first diode in a second one of the high boost ratio power conversion circuits to the last one of the high boost ratio power conversion circuits. An anode terminal of the third diode is coupled to a second terminal of the second inductor and the cathode terminal of the second diode in the each of the high boost ratio power conversion circuit. A first terminal of the second capacitor is coupled to a cathode terminal of the third diode, and a second terminal of the second capacitor is coupled to the ground terminal. The switch is coupled between the anode terminal of the third diode and the ground terminal.

On the other hand, the provided power conversion apparatus includes an AC-to-DC power conversion circuit, a high conversion ratio power conversion circuit, and a DC power conversion circuit. The AC-to-DC power conversion circuit is configured to convert an AC power to a first DC power. The high conversion ratio power conversion circuit is configured to boost or buck an auxiliary power, and accordingly generate a second DC power with a voltage value matching the first DC power. The DC power conversion circuit is coupled to the AC-to-DC power conversion circuit and the high conversion ratio power conversion circuit, and is configured to convert the first DC power and the second DC power to a DC output power.

In an exemplary embodiment, the power conversion apparatus further includes a power switch controller. The power switch controller is coupled to the AC-to-DC power conversion circuit, the high conversion ratio power conversion circuit, and the DC power conversion circuit. The power switch controller is configured to detect whether the AC-to-DC power conversion circuit satisfies a normal power-supplying condition, and control the DC power conversion circuit to generate the DC output power in response to one of the first DC power and the second DC power based on the result of the determination.

In an exemplary embodiment, when the power switch controller determines that the AC-to-DC power conversion circuit satisfies the normal power-supplying condition, the DC power conversion circuit is controlled by the power switch controller to perform a power conversion action in response to the first DC power, and thus the high conversion ratio power conversion circuit is controlled by the power switch controller to stop in operation. Moreover, when the power switch controller determines that the AC-to-DC power conversion circuit does not satisfy the normal power-supplying condition, the DC power conversion circuit is controlled by the power switch controller to perform the power conversion action in response to the second DC power, and thus the AC-to-DC power conversion circuit is controlled by the power switch controller to stop in operation.

From the above, the power conversion apparatus of the invention generates an auxiliary DC power having a voltage value substantially identical to a main DC power via the high conversion ratio power conversion circuit, such that the main power converter and the auxiliary power converter can share a same back level DC power converter to generate a DC output voltage, and therefore, the overall design complexity and the circuit layout area of the power conversion apparatus are reduced.

In order to make the aforementioned features and advantages of the invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
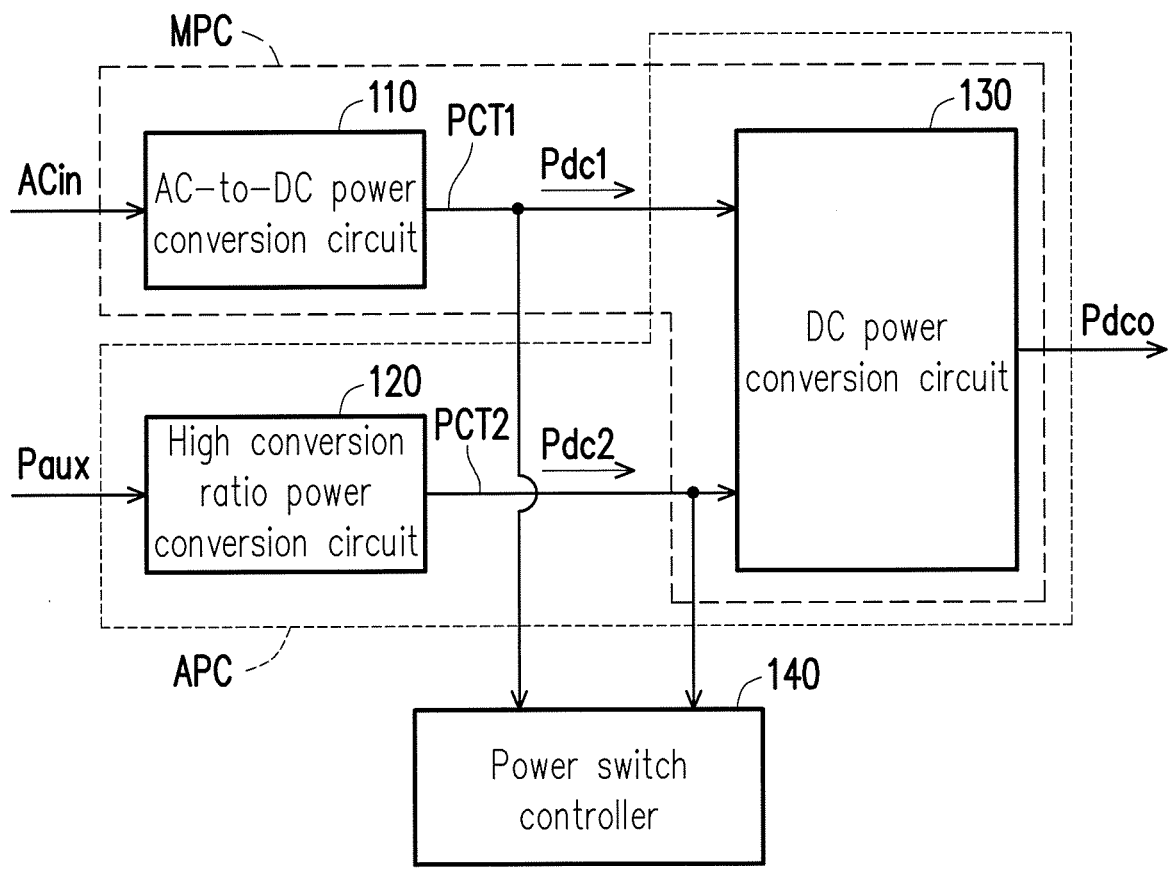
FIG. 1 is a schematic diagram illustrating a power conversion apparatus according to an exemplary embodiment.

Reference will now be made in detail to the present preferred embodiments of the invention, instances of which are illustrated in the accompanying drawings. Wherever possible, the same reference numbers are used in the drawings and the description to refer to the same or like parts.

FIG. 1 is a schematic diagram illustrating a power conversion apparatus 100 according to an exemplary embodiment. Referring to FIG. 1, the power conversion apparatus 100 includes an AC-to-DC power conversion circuit 110, a high conversion ratio power conversion circuit 120, a DC power conversion circuit 130, and a power switch controller 140. In this exemplary embodiment, the power conversion apparatus 100 is adapted to supply power to electronic devices such as tablet PC, pocket PC, personal computers, laptops, personal digital assistants (PDAs), smart phones, but not limited thereto.

The AC-to-DC power conversion circuit 110 receives an external AC power ACin (as an instance but not limited thereto: commercial power), and performs an AC-to-DC conversion on the received AC power ACin to generate a DC power Pdc1 accordingly. In this exemplary embodiment, the AC-to-DC power conversion circuit 110 is for instance a boost power factor correction circuit or a buck power factor correction circuit. In addition to performing an AC-to-DC conversion, the AC-to-DC power conversion circuit 110 performs a power factor correction on the AC power ACin, so as to maintain a better AC-to-DC conversion efficiency. In practice, the voltage value of the DC power Pdc1 generated by the AC-to-DC power conversion circuit 110 is for instance between 370V and 400V (but this invention is not limited particularly thereto).

The high conversion ratio power conversion circuit 120 receives an external auxiliary power Paux (e.g. a battery power, but not particularly limited thereto) and performs a DC-to-DC boost or buck conversion on the received auxiliary power Paux, so as to generate a DC power Pdc2 having a voltage value matching or identical to the DC power Pdc1 accordingly.

The DC power conversion circuit 130 is coupled to the AC-to-DC power conversion circuit 110 and the high conversion ratio power conversion circuit 120. The DC power conversion circuit 130 is configured to perform the DC-to-DC conversion of the second level, so as to convert the DC power Pdc1 and the DC power Pdc2 to a DC output power Pdco.

Accordingly, the circuit topology of the DC power conversion circuit 130 can be a forward power conversion circuit, a flyback power conversion circuit, an LLC resonant power conversion circuit, an active clamp and half bridge power conversion circuit, an active clamp and full bridge power conversion circuit, or a push-pull power conversion circuit, but not limited thereto. All above-mentioned power conversion circuit structures and operation methods thereof are within the knowledge of persons having ordinary skills in the art, so the details thereto are omitted.

Also, the high conversion ratio power conversion circuit 120 refers to power conversion circuits with high boost ratio or high buck ratio. For example, the auxiliary power Paux can be for instance a battery power of 48V. In this case, the high conversion ratio power conversion circuit 120 refers to for instance a power conversion circuit with boost ratio between 7.8 and 8.4. That is, through the high conversion ratio power conversion circuit 120, the 48V auxiliary power Paux is boosted to the DC power Pdc2 having a voltage value between 370V and 400V and causes the voltage value of the DC power Pdc2 to match the voltage value of the DC power Pdc1. A subsequent embodiment illustrates an application of the high conversion ratio power conversion circuit 120.

The power switch controller 140 is coupled to an output of the AC-to-DC power conversion circuit 110, an output of the high conversion ratio power conversion circuit 120, and the DC power conversion circuit 130. Here, the power switch controller 140 detects whether the AC-to-DC power conversion circuit 110 satisfies a normal power-supplying condition, and controls the DC power conversion circuit 130 to select one of the DC power Pdc1 and the DC power Pdc2 as an input power based on the result of the determination, and then to perform the DC-to-DC conversion on the input power, such that the DC output power Pdco is generated. In other words, the DC power conversion circuit 130 is controlled by the power switch controller 140, and selects the DC power Pdc1 supplied by the AC-to-DC power conversion circuit 110 or the DC power Pdc2 supplied by the high conversion ratio power conversion circuit 120 to perform the DC-to-DC conversion.

From another point of view, in the present exemplary embodiment, the AC-to-DC power conversion circuit 110 and the DC power conversion circuit 130 together form a main power converter MPC. Here, the AC-to-DC power conversion circuit 110 can be seen as a first level/front level circuit of the main power converter MPC, and the DC power conversion circuit 130 can be seen as a second/back level circuit of the main power converter MPC. On the other hand, the high conversion ratio power conversion circuit 120 and the DC power conversion circuit 130 together form an auxiliary power converter APC. Here, the high conversion ratio power conversion circuit 120 can be seen as a first level/front level circuit of the auxiliary power converter APC, and the DC power conversion circuit 130 can be seen as a second/back level circuit of the auxiliary power converter APC. In other words, the AC-to-DC power converter circuit 110, the high conversion ratio power conversion circuit 120, and the DC conversion circuit 130 together form a main-backup power conversion structure, where the DC power Pdc1 can be seen as a main DC power and the DC power Pdc2 can be seen as an auxiliary DC power.

More particularly, from the viewpoint of the system structure of the main power converter MPC and the auxiliary power converter APC, an output of the AC-to-DC power conversion circuit 110 can be seen as a first power conversion terminal PCT1 of the main power converter MPC, and an output of the high conversion ratio power conversion circuit 120 can be seen as a second power conversion terminal PCT2 of the auxiliary power converter APC. The first power conversion terminal PCT1 and the second power conversion terminal PCT2 are together or commonly coupled to an input of the DC power conversion circuit 130. In other words, the main power converter MPC and the auxiliary power converter APC share a same DC power switch circuit 130 to generate the DC output power Pdco.

From an operation viewpoint, when the power switch controller 140 determines that the main power converter MPC/AC-to-DC power conversion circuit 110 satisfies a normal power-supplying condition (as defined by the designer), the main power converter MPC/DC power conversion circuit 130 is controlled by the power switch controller 140 to perform a power conversion action according to the DC power Pdc1, and thus the auxiliary power converter APC/high conversion ratio power conversion circuit 120 is controlled by the power switch controller 140 to stop in operation.

On the other hand, when the power switch controller 140 determines that the main power converter MPC/AC-to-DC power converter circuit 110 does not satisfy the normal power-supplying condition, the auxiliary power converter APC/DC power conversion circuit 130 is controlled by the power switch controller 140 to perform the power conversion action according to the DC power Pdc2, and thus the main power converter MPC/AC-to-DC power conversion circuit 110 is controlled by the power switch controller 140 to stop in operation.

For instance, the power switch controller 140 can decide whether the power conversion apparatus 100 satisfies the normal power-supplying condition by determining whether a voltage difference between the voltage value of the DC power Pdc1 and the voltage value of the DC power Pdc2 reaches a predetermined value (as defined by the designer, and may be a 0V) or by determining whether the voltage value of the DC power Pdc1 is within a working voltage interval (as defined by the designer). More particularly, in the present exemplary embodiment, the voltage value of the DC power Pdc1 is substantially identical to the voltage value of the DC power Pdc2; therefore, if the power switch controller 140 determines that the voltage value of the DC power Pdc1 is substantially identical to that of the DC power Pdc2, or the voltage value of the DC power Pdc1 is within the working voltage interval, then it means the main power converter MPC satisfies the normal power-supplying condition, and the AC-to-DC power conversion circuit 110 is working/operating under normal condition (i.e. activated and supplying power normally). At this time, the DC power conversion circuit 130 performs the DC-to-DC conversion on the DC power Pdc1 generated by the AC-to-DC power conversion circuit 110, and accordingly generates the DC output power Pdco.

Conversely, if the power switch controller 140 determines that the voltage difference between the voltage value of the DC power Pdc1 and the voltage value of the DC power Pdc2 reaches the predetermined value, or the voltage value of the DC power Pdc1 exceeds the working voltage interval, then it means the main power converter MPC does not satisfy the normal power-supplying condition, and the AC-to-DC power conversion circuit 110 is shutdown or in a status of abnormal power supply. At this time, the DC power conversion circuit 130 performs the DC-to-DC conversion on the DC power Pdc2 generated by the high conversion ratio power conversion circuit 120, and accordingly generates the DC output power Pdco.

More particularly, compare to traditional integration design of main power converter and auxiliary power converter, by utilizing the high conversion ratio power conversion circuit 120, the main power converter MPC and the auxiliary power converter APC can produce the DC powers (Pdc1, Pdc2) of substantial identical voltage value at the output terminals of the front level conversion circuits thereof. Accordingly, the main power converter MPC and the auxiliary power converter APC can share a same DC power conversion circuit 130 to generate the DC output power Pdco.

In other words, the power conversion apparatus 100 of the invention can, unlike a traditional main-backup power conversion apparatus requiring corresponding conversion circuits at respective back levels to perform power conversion, use a shared DC power conversion circuit 130, such that the overall circuit design complexity of the power conversion apparatus 100 can be reduced, and the overall circuit layout area and size of the power conversion apparatus 100 can be substantially reduced.

Figure 2:
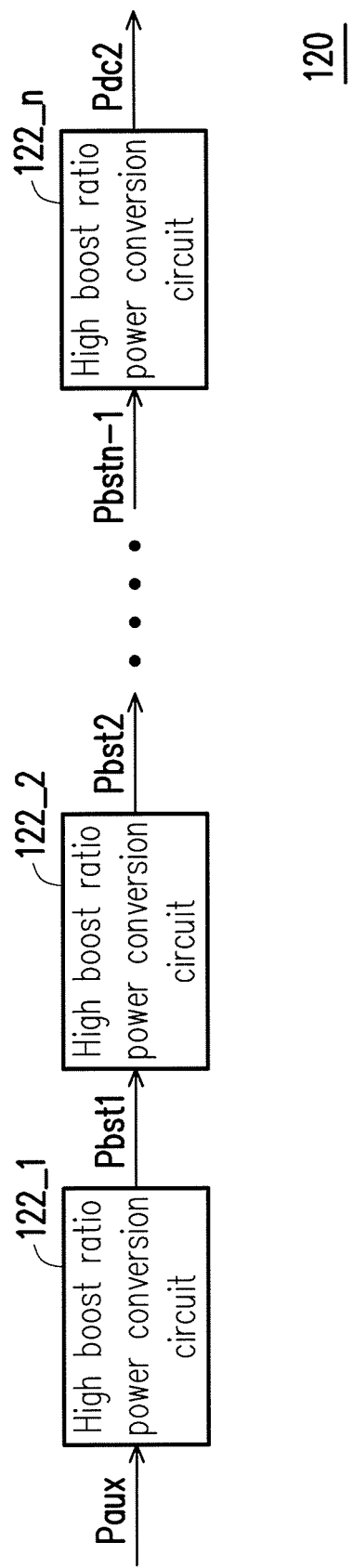
FIG. 2 is a schematic diagram illustrating a high conversion ratio power conversion circuit according to an exemplary embodiment.
Figure 3A:
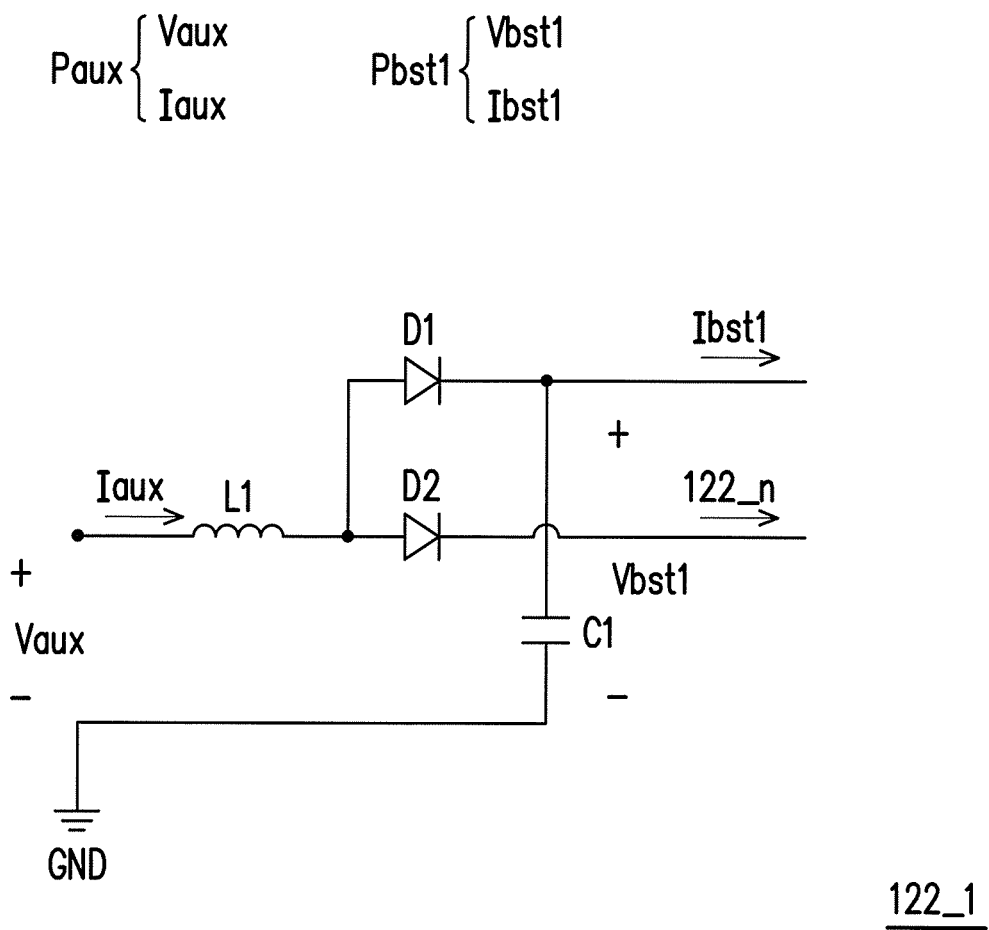
FIG. 3A and FIG. 3B show a schematic diagram illustrating high boost ratio power conversion circuits according to an exemplary embodiment.
Figure 3B:
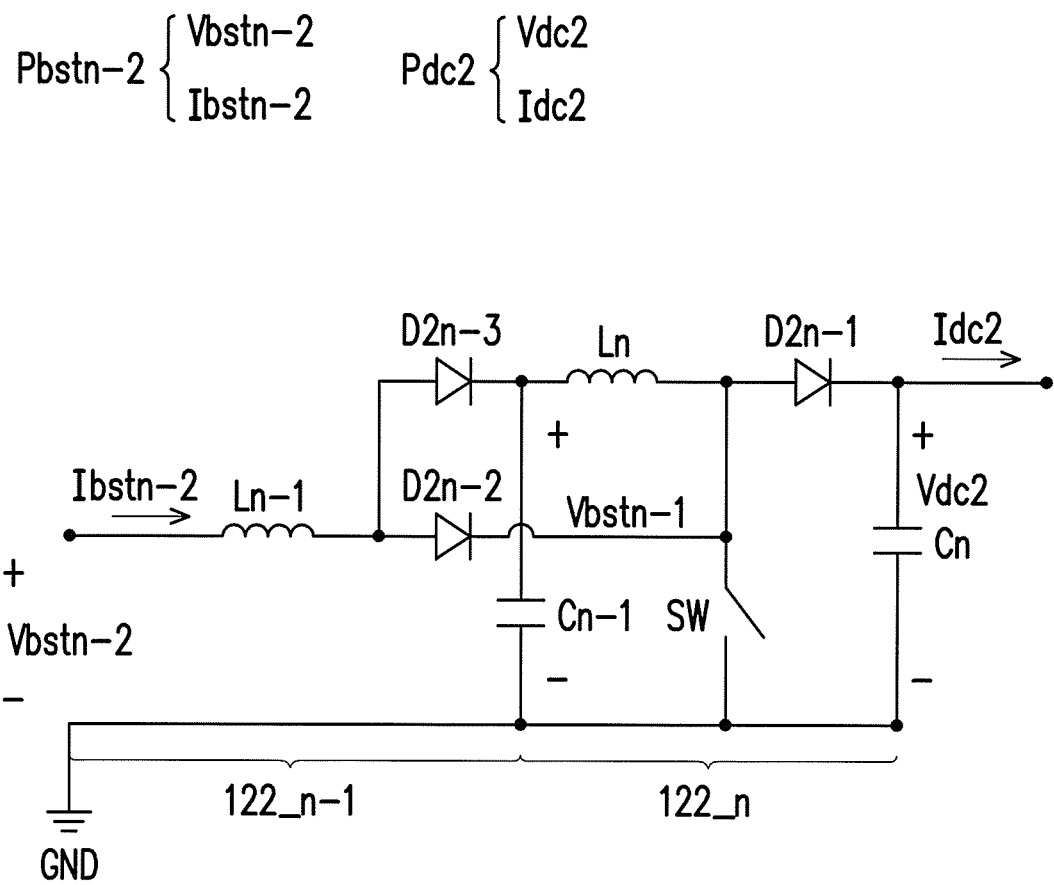

FIGS. 2, 3A, and 3B are implementations of the high conversion ratio power conversion circuit 120 according to an exemplary embodiment.

FIG. 2 is a schematic diagram illustrating the high conversion ratio power conversion circuit according to an exemplary embodiment. Referring to FIG. 2, the high conversion ratio power conversion circuit 120 includes n levels of high boost ratio power conversion circuits 122_1~122_n, where n is a positive integer and can be defined by the designer. The invention does not set a particular limit thereto.

In the present embodiment, the n levels of high boost ratio power conversion circuits 122_1~122_n are configured to perform boost conversion on the auxiliary power Paux. The n levels of high boost ratio power conversion circuits 122_1~122_n are serially connected in sequence. As shown in FIG. 2, an input terminal of a first ($1^{st}$) level high boost ratio power conversion circuit 122_1 receives the auxiliary power Paux, and the first ($1^{st}$) level high boost ratio power conversion circuit 122_1 performs the boost conversion on the auxiliary power Paux to generate a DC power Pbst1. An input terminal of a second ($2^{nd}$) level high boost ratio power conversion circuit 122_2 is coupled to an output terminal of the first ($1^{st}$) level high boost ratio power conversion circuit 122_1 and receives the DC power Pbst1. Here, the second ($2^{nd}$) level high boost ratio power conversion circuit 122_2 performs the boost conversion on the received DC power Pbst1 to generate a DC power Pbst2, and so on, each of the subsequent levels of high boost ratio power conversion circuits 122_3~122_n can be inferred from the connection and operation relations about the first ($1^{st}$) and second ($2^{nd}$) level high boost ratio power conversion circuits 122_1 and 122_2. The last level/$n^{th}$ level high boost ratio power conversion circuit 122_n receives a DC power Pbstn−1 outputted by the previous level high boost ratio power conversion circuit 122_n−1 and accordingly generates the DC power Pdc2 to the DC power conversion circuit 130.

The following further illustrates with the circuit structures of the first ($1^{st}$) level high boost ratio power conversion circuit 122_1 in FIG. 3A and the (n−1)$^{th}$ level and the n$^{th}$ level high boost ratio power conversion circuits (122_n−1, 122_n) in FIG. 3B. The structures and operations of other levels of high boost ratio power conversion circuits can be also illustrated below, so the details thereto are omitted.

Referring to FIG. 3A, the high boost ratio power conversion circuit 122_1 includes an inductor L1, a capacitor C1, and two diodes D1 and D2. In the present embodiment, a first terminal of the inductor L1 is an input terminal of the high boost ratio power conversion circuit 122_1, and receives an auxiliary voltage Vaux (other levels of high boost ratio power conversion circuits 122_2~122_n receive the DC voltage outputted by a previous level of high boost ratio power conversion circuits 122_1~122_n). The anode terminals of the diodes D1 and D2 are coupled to a second terminal of the inductor L1. A cathode terminal of the diode D2 is coupled to the last level high boost ratio power conversion circuit 122_n. The capacitor C1 is used as an output capacitor. A first terminal of the capacitor C1 is coupled to a cathode terminal of the diode D1 and serves as an output terminal of the high boost ratio power conversion circuits 122_1. A second terminal of the capacitor C1 is coupled to a ground terminal GND. Here, the cross voltage of the capacitor C1 is a DC voltage Vbst1 outputted by the high boost ratio power conversion circuit 122_1.

Referring to FIG. 3B, the (n−1)$^{th}$ level high boost ratio power conversion circuit 122_n−1 includes an inductor Ln−1, a capacitor Cn−1, and two diodes D2n−3 and D2n−2. In addition, the n$^{th}$ level high boost ratio power conversion circuit 122_n includes an inductor Ln, a capacitor Cn, a diode D2n−1, and a switch SW. The following illustrates with the overall structure of the (n−1)$^{th}$ level and the n$^{th}$ level of high boost ratio power conversion circuits 122_n−1 and 122_n.

In the present embodiment, the overall circuit configuration of the high boost ratio power conversion circuits 122_n−1 is similar to that in FIG. 3A, the high boost ratio power conversion circuits 122_n−1 would receive an DC power Pbstn−2{Vbstn−2, Ibstn−2} outputted by a previous level high boost ratio power conversion circuit 122_n−2, and provide the boosted DC power Pbstn−1{Vbstn−1, Ibstn−1} on the output capacitor Cn−1 to the n$^{th}$ level high boost ratio power conversion circuits 122_2 accordingly. The specific configuration of the high boost ratio power conversion circuit 122_n−1 is similar to that in FIG. 3A, so the details thereto would not be repeated.

In the n$^{th}$ level high boost ratio power conversion circuits 122_n, a first terminal of the inductor Ln serves as an input terminal to be coupled to a first terminal of the capacitor Cn−1 and to receive a DC voltage Vbstn−1. An anode terminal of the diode D2n−1 is coupled to a second terminal of the inductor Ln and cathode terminals of diodes D2, D4, to D2n-2 of high boost ratio power conversion circuits 122_1~122_n-1. The capacitor Cn is used as an output capacitor. A first terminal of the capacitor Cn is coupled to a cathode terminal of the diode D2n-1, and serves as an output terminal of the high boost ratio power conversion circuit 122_n. A second terminal of the capacitor Cn is coupled to the ground terminal GND. Here, the cross voltage of the capacitor Cn is a DC voltage Vdc2 outputted by the high boost ratio power conversion circuit 122_n.

The switch SW is coupled between the anode ten final of the diode D2n-1 and the ground terminal GND. The switching of the switch SW can be controlled in response to a control signal (may be a pulse width modulation signal provided by an external control circuit, but not limited particularly thereto). Here, the switch SW would repeatedly switch in response to the received control signal, such that a resonant tank comprised of the inductors L1~Ln and capacitors C1~Cn in the high boost ratio power conversion circuits 122_1~122_n would respond to the switching of the switch SW for charging/discharging, so as to generate the DC power Pdc2{DC voltage Vdc2 and DC current Idc2} at two terminals of the capacitor Cn.

More particularly, based on the operations of the $(n-1)^{th}$ level and the $n^{th}$ level high boost ratio power conversion circuits 122_n-1 and 122_n, when the switch SW is turned on in response to the control signal, diodes D2n-3 and D2n-2 simultaneously respond to a forward bias and are turned on, such that the inductors Ln-1 and Ln are simultaneously charged. When configured in this manner, the inductors Ln-1 and Ln are equivalent to being connected in parallel for energy storage.

When the switch SW is turned off in response to the control signal, the diode D2n-3 remains on and the diode D2n-2 is turned off. When configured in this manner, the inductors Ln-1 and Ln are equivalent to being connected in series for energy discharging. Accordingly, while the switch SW is off, the inductors Ln-1 and Ln are equivalent to being connected in series for energy discharging based on a summed cross voltage thereof.

Here, the first $(1^{st})$ to the $(n-1)^{th}$ levels of high boost ratio power conversion circuits 122_1~122_n-1 would function with the last level/$n^{th}$ level high boost ratio power conversion circuit 122_n based on the above method, so as to generate the DC voltage Vdc2 with the summed cross voltage of the inductors L1~Ln of the n levels of high boost ratio power conversion circuits 122_1~122_n. Accordingly, compared to traditional single-level boost conversion circuit, the structure of the high boost ratio power conversion circuits 122_1~122_n in the present embodiment can generate higher DC voltage Vdc2.

It is worthy to mention that the high conversion ratio power conversion circuit 120 of FIGS. 2, 3A, and 3B are illustrations, the invention is not limited particularly thereto. Any power conversion structure(s) with high boost/buck ratio for generating the DC power Pdc2 having the voltage value substantially identical to the DC power Pdc1 based on conversion of the auxiliary power Paux would be within the scope of the high conversion ratio power conversion circuit 120.

Moreover, the structure of the high boost ratio power conversion circuits 122_1~122_n are not particularly limited to the circuit structure illustrated in FIGS. 3A and 3B. More particularly, under the operation concept of FIG. 3B, person having ordinary skills understand that any serially arranged derivative circuit configuration(s) having high boost ratio and multiple levels of circuits (for generating the DC voltage with the cross voltage of resonant elements in the respective levels of circuits that to be equivalent to being serially connected in response to the switching of the power switch) would be within the scope of the high boost ratio power conversion circuits 122_1~122_n.

Based on the above, the power conversion apparatus of the invention generates an auxiliary DC power having a voltage value substantially identical to a main DC power via a high conversion ratio power conversion circuit, such that the main power converter and the auxiliary power converter can share a same back level DC power converter to generate a DC output power, and therefore, the overall design complexity and the circuit layout area of the power conversion apparatus are reduced.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A power conversion apparatus, comprising:
a main power converter converting an AC power to a first DC power and then converting the first DC power to a DC output power, wherein the main power converter has a first power conversion terminal for outputting the first DC power; and
an auxiliary power converter converting an external auxiliary power to a second DC power and then converting the second DC power to the DC output power, wherein the auxiliary power converter has a second power conversion terminal for outputting the second DC power,
wherein the first power conversion terminal and the second power conversion terminal are commonly coupled to a DC power conversion circuit, such that the main power converter and the auxiliary power converter share the DC power conversion circuit and generate the DC output power,
wherein the auxiliary power converter comprises:
a high conversion ratio power conversion circuit receives the external auxiliary power, and performs a DC-to-DC conversion on the received external auxiliary power, and a voltage value of the second DC power matches a voltage value of the first DC power,
wherein the high conversion ratio power conversion circuit comprises:
at least one of a plurality of high boost ratio power conversion circuits for boosting the external auxiliary power, wherein the high boost ratio power conversion circuits are serially connected, an input terminal of a first one of the high boost ratio power conversion circuits receives the external auxiliary power, and an output terminal of a last one of the high boost ratio power conversion circuits outputs the second DC power.

2. The power conversion apparatus of claim 1, further comprising:
a power switch controller coupled to the first power conversion terminal, the second power conversion terminal and the DC power conversion circuit, wherein the power switch controller detects whether the main power converter satisfies a normal power-supplying condition, and generates the DC output power with one of the main power converter and the auxiliary power converter based on the result of the determination.

3. The power conversion apparatus of claim 2, wherein:
when the power switch controller determines that the main power converter satisfies the normal power-supplying condition, the main power converter is controlled by the power switch controller to perform a power conversion action and generate the DC output power accordingly, and thus the auxiliary power converter is controlled by the power switch controller to stop in operation; and
when the power switch controller determines that the main power converter does not satisfy the normal power-supplying condition, the auxiliary power converter is controlled by the power conversion controller to perform the power conversion action and generate the DC output power accordingly, and thus the main power converter is controlled by the power switch controller to stop in operation.

4. The power conversion apparatus of claim 1, wherein the main power converter comprises:
a power factor correction circuit configured to perform a power factor correction action on the AC power, and accordingly generate the first DC power.

5. The power conversion apparatus of claim 4, wherein the high conversion ratio power conversion circuit is configured to boost or buck the external auxiliary power.

6. The power conversion apparatus of claim 5, wherein the main power converter and the auxiliary power converter commonly comprise:
the DC power conversion circuit coupled to the power factor correction circuit and the high conversion ratio power conversion circuit, wherein the DC power conversion circuit is configured to convert one of the first DC power and the second DC power to the DC output power.

7. The power conversion apparatus of claim 1, wherein, except the last one of the high boost ratio power conversion circuits, each high boost ratio power conversion circuit comprises:
a first inductor having a first terminal as an input terminal of the each high boost ratio power conversion circuit;
a first diode having an anode terminal coupled to a second terminal of the first inductor;
a second diode having an anode terminal coupled to the second terminal of the first inductor, and a cathode terminal coupled to the last one of the high boost ratio power conversion circuits; and
a first capacitor having a first terminal coupled to a cathode terminal of the first diode, and a second terminal coupled to a ground terminal, wherein the first terminal of the first capacitor serves as an output terminal of the each high boost ratio power conversion circuit.

8. The power conversion apparatus of claim 7, wherein the last one of the high boost ratio power conversion circuits comprises:
a second inductor having a first terminal coupled to the cathode terminal of the first diode in a second one of the high boost ratio power conversion circuits to the last one of the high boost ratio power conversion circuits;
a third diode having an anode terminal coupled to a second terminal of the second inductor and the cathode terminal of the second diode in the each high boost ratio power conversion circuit;
a second capacitor having a first terminal coupled to a cathode terminal of the third diode, and a second terminal coupled to the ground terminal; and
a switch coupled between the anode terminal of the third diode and the ground terminal.

9. A power conversion apparatus, comprising:
an AC-to-DC power conversion circuit configured to convert an AC power to a first DC power;
a high conversion ratio power conversion circuit configured to receive an external auxiliary power, and perform a DC-to-DC conversion on the received external auxiliary power, and accordingly generate a second DC power with a voltage value matching a voltage value of the first DC power; and
a DC power conversion circuit coupled to the AC-to-DC power conversion circuit and the high conversion ratio power conversion circuit, and configured to convert the first DC power and the second DC power to a DC output power,
wherein the high conversion ratio power conversion circuit comprises:
at least one of a plurality of high boost ratio power conversion circuits for boosting the external auxiliary power, wherein the high boost ratio power conversion circuits are serially connected, an input terminal of a first one of the high boost ratio power conversion circuits receives the external auxiliary power, and an output terminal of a last one of the high boost ratio power conversion circuits outputs the second DC power.

10. The power conversion apparatus of claim 9, further comprising:
a power switch controller coupled to the AC-to-DC power conversion circuit, the high conversion ratio power conversion circuit and the DC power conversion circuit, and configured to detect whether the AC-to-DC conversion circuit satisfies a normal power-supplying condition, and control the DC power conversion circuit to generate the DC output power in response to one of the first DC power and the second DC power based on the result of the determination.

11. The power conversion apparatus of claim 10, wherein:
when the power switch controller determines that the AC-to-DC power conversion circuit satisfies the normal power-supplying condition, the DC power conversion circuit is controlled by the power switch controller to perform a power conversion action in response to the first DC power, and thus the high conversion ratio power conversion circuit is controlled by the power switch controller to stop in operation; and
when the power switch controller determines that the AC-to-DC power conversion circuit does not satisfy the normal power-supplying condition, the DC power conversion circuit is controlled by the power switch controller to perform the power conversion action in response to the second DC power, and thus the AC-to-DC power conversion circuit is controlled by the power switch controller to stop in operation.

12. The power conversion apparatus of claim 9, wherein the AC-to-DC power conversion circuit is a power factor correction circuit.

13. The power conversion apparatus of claim 9, wherein, except the last one of the high boost ratio power conversion circuits, each high boost ratio power conversion circuit comprise:
a first inductor having a first terminal as an input terminal of the each high boost ratio power conversion circuit;
a first diode having an anode terminal coupled to a second terminal of the first inductor;

a second diode having an anode terminal coupled to the second terminal of the first inductor, and a cathode terminal coupled to the last one of the high boost ratio power conversion circuits; and a first capacitor having a first terminal coupled to a cathode terminal of the first diode, and a second terminal coupled to a ground terminal, wherein the first terminal of the first capacitor serves as an output terminal of the each high boost ratio power conversion circuit.

14. The power conversion apparatus of claim 13, wherein the last one of the high boost ratio power conversion circuits comprises:

a second inductor having a first terminal coupled to the cathode terminal of the first diode in a second one of the high boost ratio power conversion circuits to the last one of the high boost ratio power conversion circuits;

a third diode having an anode terminal coupled to a second terminal of the second inductor and the cathode terminal of the second diode in the each high boost ratio power conversion circuit;

a second capacitor having a first terminal coupled to a cathode terminal of the third diode, and a second terminal coupled to the ground terminal; and a switch coupled between the anode terminal of the third diode and the ground terminal.

* * * * *